May 11, 1954

M. MALLORY 2,677,855

METHOD OF MAKING IGNITION DISTRIBUTOR CAPS

Filed May 3, 1951

INVENTOR.
Marion Mallory.
BY
Barnes, Kisselle, Laughlin & Raisch
ATTORNEYS.

May 11, 1954

M. MALLORY 2,677,855

METHOD OF MAKING IGNITION DISTRIBUTOR CAPS

Filed May 3, 1951

INVENTOR.
Marion Mallory
BY
Barnes, Kisselle, Laughlin & Raisch
ATTORNEYS

Patented May 11, 1954

2,677,855

UNITED STATES PATENT OFFICE 2,677,855

METHOD OF MAKING IGNITION DISTRIBUTOR CAPS

Marion Mallory, Detroit, Mich.

Application May 3, 1951, Serial No. 224,374

11 Claims. (Cl. 18—59)

This invention relates to a method of making ignition distributor caps.

In in electric ignition system for an internal combustion engine the circuit is such that the secondary electric current passes from the secondary winding of the coil to a rotary distributor arm. The distributor arm is floated upon a spring which holds it against a circular track. As the distributor arm rotates, it passes by the segments in the distributor cap where it jumps from the distributor arm to the segment contacts as it sweeps by them and is conducted by the distributor wires usually to the center spark plug electrode where it jumps to the ground electrode and then passes through the engine to the frame of the car and back to the battery.

In a distributor cap having a jump contact it is essential that the gap between each of the distributor segments or contacts and the rotary distributor arm should be maintained within a close tolerance, for example, .001 inch to .003 inch.

The distributor segments or contacts are usually molded into the cap and thereafter the track upon which the floating distributor arm slides is machined down to obtain the proper clearance between the distributor arm and these segments. Since these distributor caps are usually made of a molded plastic such as phenol formaldehyde resin (Bakelite), the machining of the track is difficult and expensive.

This invention contemplates a method for molding a distributor cap so that the track for the rotary distributor arm will be accurately and precisely positioned with respect to the distributor segments or contacts to thereby give the precise clearance between the distributor arm and contact segments without any need for machining either the track or the segments. According to the method, which is the subject of this invention, the contact points and track are precisely located one with respect to the other during a single molding step so that the present method effects considerable economy in the manufacture of the distributor cap and produces a better cap.

Figure 1:
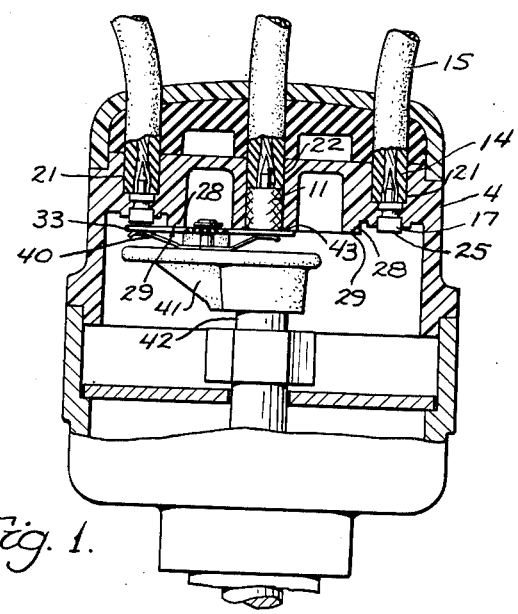
Fig. 1 is a sectional view showing an ignition distributor head having a cap made by the herein described method.
Figure 2:
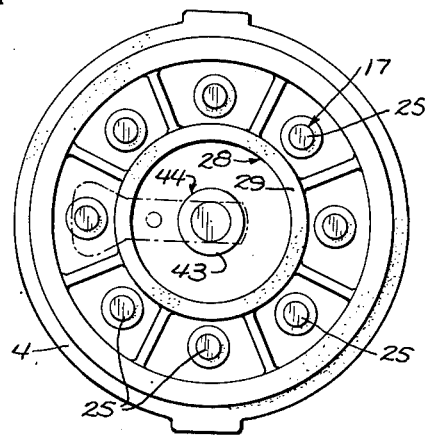
Fig. 2 is a bottom plan view of the cap.

In the drawings, by way of example, there is shown an apparatus for practicing the present method of fabricating a distributor cap. The upper die or mold 1 is mounted on a stationary part 2 of the molding press. The lower die or mold 3 is mounted upon a retractable part of the molding machine. The mold 1, 3 will be designed so that the cavity will conform precisely to the shape or form of the distributor cap 4.

As shown herein, the distributor cap is designed for an eight cylinder engine. Accordingly the lower die 3 is provided with eight axial openings 5 equally spaced around the circumference of the die 3 and a central opening 6. Reciprocating plungers 7 are located in each of the openings 5 and a reciprocating plunger 8 is located in the central opening 6. While the dies are open the ends of the plungers 7 are drawn inwardly of the upper ends of the openings 5 as at 9 to provide sockets into which each of the distributor contacts or segments 10 is positioned. The center plunger 8 projects above the upper face of the die 3 and the center contact 11 which receives the current from the secondary of the ignition coil is positioned over the upper end of plunger 8 so as to rest upon the upper face of the die 3 as at 12.

The distributor segment or contact, which is generally designated 10, is shown in its original condition as at 5. The segment 10 comprises a pointed upper end 13 which forms the distributor terminal upon which the socket 14 of the spark plug wire 15 is impaled, Fig. 1. The segment 10 comprises two body portions 16 and 17 which, by way of example, are shown as cylindrical. The body portions 16 and 17 are connected by a weakened intermediate portion in the form of a narrow neck 18. The segment 10 can be made from any metal or alloy commonly used for this purpose.

Figure 4:
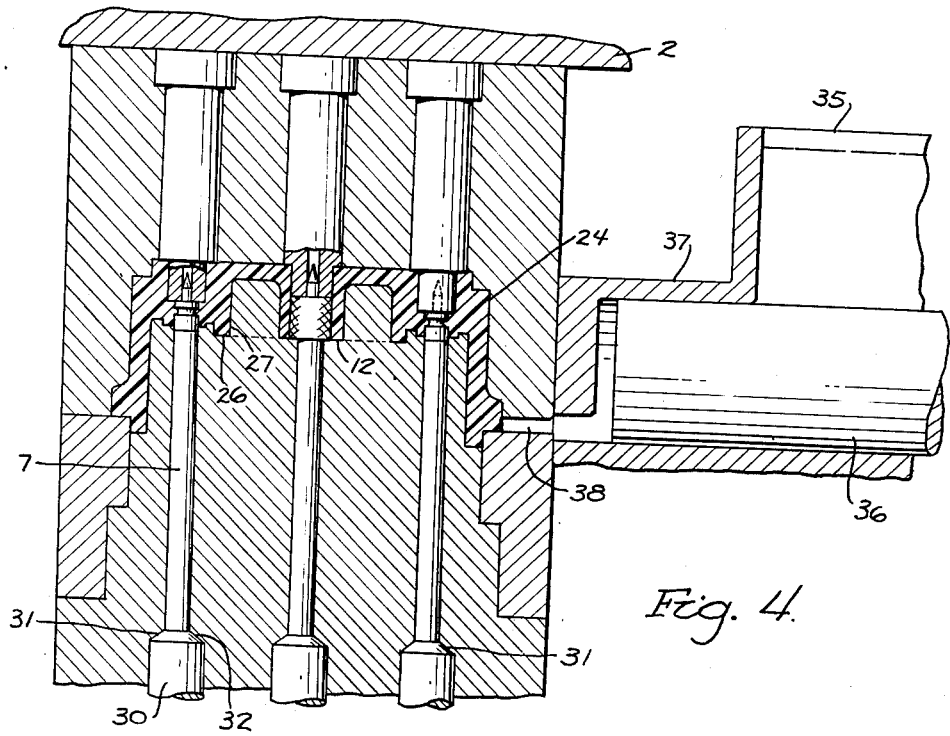

After the distributor segments 10 and center contact 11 have been positioned in the die 3 and seated upon their respective plungers 7 and plunger 8, the dies 1 and 3 are closed, Fig. 4. The pointed ends 13 of the contacts project into axial openings 19 provided in the cylindrical projections 20 on the upper die 1. These projections 20 simply form the recessed openings 21 and 22 in the cap surrounding the points 13. When the dies are closed, Fig. 4, the plungers 7 cause the upper faces of the contact body portions 16 to seat against the bottom faces 23 of the extensions 20. Since extensions 20 are stationary, this positively locates the contacts 10 in the mold cavity 24 when the dies are closed.

However, the faces 25 of each of the distributor segments or contacts have not as yet been located with respect to the lower face 26 of the circular groove 27 which forms the circular track 28. To accomplish this end the plungers 7 are now moved upwardly from the loading position, shown in Fig. 5, to their final position, shown in Fig. 6, so that the face 25 of each contact 10 is equally positioned with respect to the bottom face 26 of groove 27 to provide a clearance within desired limits, for example, .001 to .003 inch. The plungers 7 can be actuated by any suitable means, for example, hydraulically or by means of a cam (not shown) and can be stopped in their final position, Fig. 6, by any suitable stop arrangement. By way of example, the plungers 7 have their lower ends 30 enlarged to provide shoulders 31 which abut against stops 32 formed in the lower die 3 to effect the proper location of face 25 with respect to the face 26 of the groove 27. During the axial movement of the plunger 7 from the loading position, Fig. 5, to the final or molding position, Fig. 6, the weakened section or neck 18 of each of the segments 19 is crushed or compressed thereby permitting movement of body portion 16 toward body portion 17 to effect the proper positioning of the contact faces 25 with respect to the face 29 of the track 28 upon which the floating contact arm 33 slides.

Figure 6:
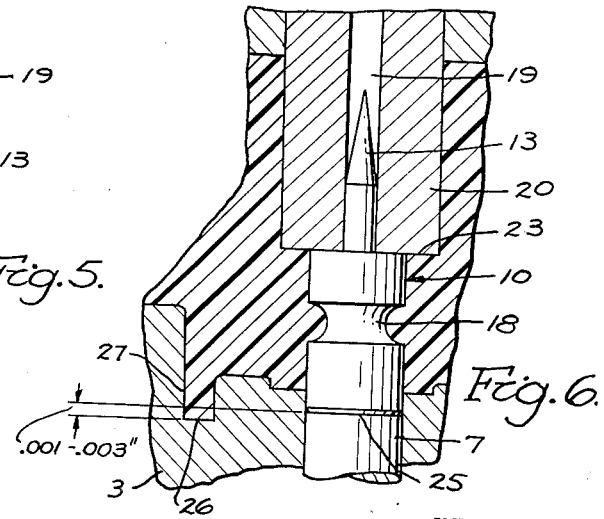

With the dies closed and the distributor segments located, as indicated in Fig. 6, a plastic is now charged into the mold cavity 24. Preferably the distributor cap 4 is pressure molded. To accomplish this end any suitable plastic in powdered form such, for example, as phenol formaldehyde resin (Bakelite) is loaded into the hopper 35 and heated by any suitable means to render the same plastic. A plunger 36 sweeps the thus heated plastic from hopper 35 into cylinder 37 and forces this plastic through die opening 38 under greater pressure into the mold cavity 24 and about the previously located distributor segments or contacts 10 and center post 11. After the plastic material is forced into mold cavity 24, which is preferably a thermosetting resin although a thermoplastic resin having a high enough melting temperature can be used, the plunger 36 is retracted and the mold dies 1 and 3 opened and the finished distributor cap 4 removed.

Figure 3:
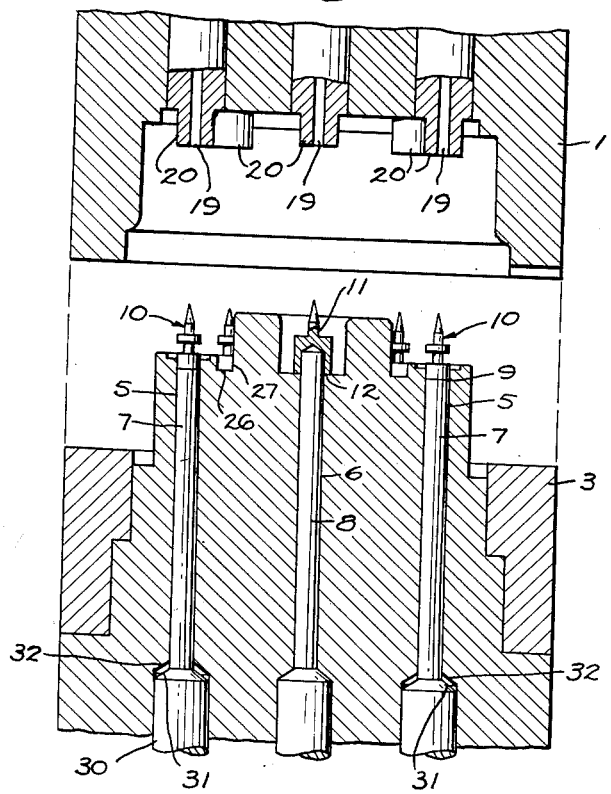
Figs. 3 and 4 are sections of a suitable plastic molding machine illustrating the herein method of molding a distributor cap.
Figure 5:
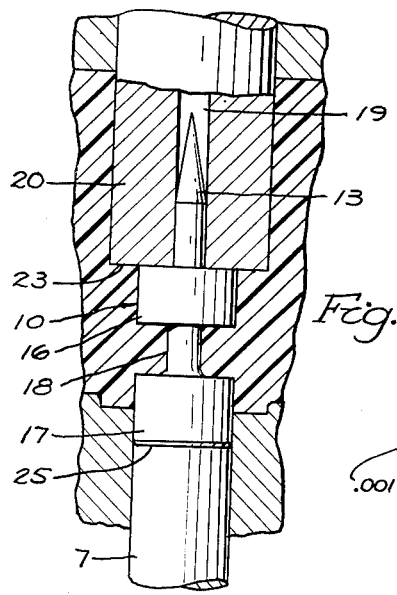
Figs. 5 and 6 are enlarged details showing the step of locating the distributor segment or contact with respect to the track for the distributor arm.

By referring to Fig. 1, it will be seen that the sweeper 33, which is floated by means of spring 40 upon the distributor arm 41 carried by shaft 42, is now yieldably pressed against the face 29 of circular track 28 and is also yieldably pressed against the face 43 of the circular track 44 immediately surrounding the center contact 11. Face 43 of the center track 44 is, during the molding operation, located in the plane of face 29 because the upper face portions 26 and 12 of the lower die 3 are located in the same plane, Figs. 3 and 4. Since the spring holds rotary sweeper 33 flatly against face 29 of track 28 and also against the inner track or pivot 44, the clearance between the face of the sweeper 33 and the face 25 of each segment or contact 10 is accurately accomplished and maintained due entirely to the locating of the contacts, as illustrated in Figs. 5 and 6, preparatory to the molding step. Preferably the locating of face 25 of each of the contacts 10 with respect to upper faces 26 and 12 of the lower die is done before the plastic is pressure injected into the mold but, of course, this locating can be done after the plastic is injected into the mold under pressure but before the plastic sets and while it is still in a plastic condition.

I claim:
1. The method for fabricating a cap for a distributor of the type having a plurality of circumferentially spaced stationary contacts to which the current is distributed by a rotary sweeper contact which sweeps across the contact faces at one end of said stationary contacts in spaced relation therewith to provide a jump spark, comprising the steps of positioning the distributor contacts in spaced circular relation within a mold cavity with said contact faces located without the cavity, bringing pressure members into face-to-face contact with said contact faces, compressing said distributor contacts axially against said pressure members to displace their contact faces into the same plane and spaced accurately axially of the distributor cap with respect to a surface of the mold which defines the track surface along which the rotary sweeper contact slides, and while said pressure members are in face-to-face contact with said contact faces filling said cavity with a plastic about said distributor segments and setting said plastic to form a rigid distributor cap with the track for the sweeper contact accurately located in relation to the distributor contact faces.

2. The method defined in claim 1 wherein the distributor contacts are provided with a narrow neck portion which is distorted when the contact is axially compressed against said pressure members to bring the contact face into accurate position with respect to the surface of the die forming the track face for the rotary sweeper contact.

3. The method defined in claim 1 wherein the distributor contacts are provided with a narrow neck portion which is distorted when the contact is axially compressed to bring the contact face into accurate position with respect to the surface of the mold forming the track face for the rotary sweeper contact, and the step of filling the mold cavity with a plastic is performed after the faces of the distributor contacts have been located accurately with respect to the surface of the mold which defines the track surface for the rotary sweeper contact.

4. The method defined in claim 3 wherein the cavity is filled with a thermosetting plastic material.

5. The method for fabricating a cap for a distributor of the type having a plurality of circumferentially spaced stationary contacts to which the current is distributed by a rotary sweeper contact which sweeps across the contact faces at one end of said stationary contacts in spaced relation therewith to provide a jump spark, comprising the steps of positioning a plurality of distributor contacts having body portions connected with a reduced neck portion in a circle of a mold cavity with said contact faces located without the cavity, holding one body portion of each of the distributor contacts in fixed contacting relation with a supporting surface within the mold while holding the other body portion of each contact in contacting relation with another supporting surface in the mold and applying axial pressure to said other body portion to thereby compress the distributor contact members, axially displacing said last mentioned body portion and the metal in said reduced neck portion and thereby locate the contact faces in a plane axially offset a few thousandths of an inch from the plane of a surface in the mold which defines the circular track surface along which the rotary sweeper contact slides, the contact face of each distributor contact engaging one of said supporting surfaces in face-to-face relation during said step of axial compression, and while said contact faces are so engaged filling the cavity with a plastic about the said distributing contacts and setting said plastic to form a rigid distributor cap with the track for the sweeper contact accurately located in relation to the contact faces of said distributor contacts.

6. The method for fabricating a cap for a distributor of the type having a plurality of circumferentially spaced stationary contacts to which the current is distributed by a rotary sweeper contact which sweeps across the contact faces at one end of said contacts in spaced relation therewith to provide a jump spark comprising the steps of positioning the distributor contacts in a mold with the portion of each contact provided with said contact face projecting into the mold cavity, holding one end portion of each of the distributor contacts fixed in relation to the mold cavity while compressing the distributor contact member axially and by said compression axially displacing a portion of said contact member to space said contact face of the distributor contact axially inwardly of a surface of the mold forming the track surface for the rotary sweeper contact arm, surrounding the contact face of each distributor contact with a member which seals said contact face from the mold cavity, and while said contact faces are thus sealed from the mold cavity filling the mold with a plastic under pressure to surround the portion of the contacts within the mold cavity with said plastic and to form a track for the rotary sweeper contact and setting said plastic to rigidly hold the contacts in said relation with the said track.

7. The method defined in claim 6 wherein the compressing of the distributor contacts is effected before the plastic is forced into the mold cavity.

8. The method defined in claim 6 wherein the compressing of the distributor contacts is effected while the plastic in the cavity is in a plastic condition.

9. The method defined in claim 5 wherein the body portion of the contact provided with said contact face is displaced axially of the mold by said axial compression.

10. The method defined in claim 6 wherein the portion of the contact provided with said contact face is displaced axially of the mold by said axial compression.

11. The method of fabricating a cap for a distributor of the type having a plurality of circumferentially spaced stationary contacts to which the current is distributed by a rotary sweeper contact which sweeps across the contact faces at one end of said stationary contacts in spaced relation therewith to provide a jump spark, comprising the steps of positioning the distributor contacts in a mold cavity with a portion of each contact projecting into the mold cavity with the end portion of the contact opposite said contact faces abutting axially against a fixed surface of the mold and with each contact face in face-to-face relation with a movable pressure applying member, applying axial pressure to said contact faces through said pressure applying members and by said axial pressure compressing said contacts axially against said fixed surface of said mold and axially displacing said contact faces inwardly of another surface of the mold forming the track surface for the rotary sweeper contact arm, and while said contact faces are in face-to-face contact with said pressure applying members filling the mold with a plastic under pressure to surround the portion of the contacts within the mold cavity with said plastic and to form a track for the rotary sweeper contact and setting said plastic to rigidly hold the contacts in said relation with the said track.

References Cited in the file of this patent

UNITED STATES PATENTS

| Number | Name | Date |
| --- | --- | --- |
| 1,161,194 | Cook | Nov. 23, 1915 |
| 1,218,568 | Kennington | Mar. 6, 1917 |
| 1,641,923 | Davis | Sept. 6, 1927 |
| 2,040,674 | Severance | May 12, 1936 |

OTHER REFERENCES

Serial No. 391,198, Chapuis (A. P. C.), published June 15, 1943.

Ellis, "Synthetic Resins," 1923, pages 396, 397 and 428, Chemical Catalog Com., Inc., 19 E. 24th St., N. Y., N. Y.